(12) United States Patent
Ariesen et al.

(10) Patent No.: US 12,573,841 B2
(45) Date of Patent: Mar. 10, 2026

(54) CABLE NETWORK POWER UNIT FOR SURGE PROTECTOR RELEASE

(71) Applicant: TECHNETIX B.V., Veenendaal (NL)

(72) Inventors: Jan Ariesen, Veenendaal (NL); Diego Royo Moros, Veenendaal (NL)

(73) Assignee: TECHNETIX B.V., Veenendaal (NL)

( * ) Notice: Subject to any disclaimer, the term of this patent is extended or adjusted under 35 U.S.C. 154(b) by 211 days.

(21) Appl. No.: 18/653,384

(22) Filed: May 2, 2024

(65) Prior Publication Data

US 2024/0396326 A1 Nov. 28, 2024

(30) Foreign Application Priority Data

May 23, 2023 (GB) ...................................... 2307675

(51) Int. Cl.
*H02H 9/02* (2006.01)
*H02H 1/00* (2006.01)

(52) U.S. Cl.
CPC ............ *H02H 9/02* (2013.01); *H02H 1/0007* (2013.01)

(58) Field of Classification Search
CPC .......... H02H 9/02; H02H 1/0007; H02H 9/06; H02H 1/06; H02H 9/048; H02H 9/041; H02H 9/042; H02H 9/045; H02H 3/445; H02H 7/268; H04L 12/10
USPC ...................................................... 361/93.1
See application file for complete search history.

(56) References Cited

U.S. PATENT DOCUMENTS

| | | | | |
|---|---|---|---|---|
| 5,053,910 A * | 10/1991 | Goldstein | .............. | H04N 7/102 |
| | | | | 361/111 |
| 5,652,547 A * | 7/1997 | Mokhtar | ................ | H03G 3/004 |
| | | | | 330/279 |
| 6,954,347 B1 * | 10/2005 | Chaudhry | ............... | H04M 3/18 |
| | | | | 361/119 |
| 7,592,781 B2 * | 9/2009 | Hsieh | .................. | H02J 7/00309 |
| | | | | 307/127 |
| 7,668,572 B2 | 2/2010 | Van de Water | | |
| 10,700,515 B2 * | 6/2020 | Krumpholz | ............ | H02H 9/041 |
| 10,768,242 B1 * | 9/2020 | Kitchin | ..................... | H02J 4/00 |
| 11,764,569 B2 * | 9/2023 | Dong | ..................... | H04B 3/548 |
| | | | | 361/118 |
| 2005/0259376 A1 * | 11/2005 | Bishop | ..................... | H02H 9/06 |
| | | | | 361/120 |
| 2006/0146458 A1 * | 7/2006 | Mueller | ................... | H01Q 1/50 |
| | | | | 361/56 |
| 2007/0097583 A1 * | 5/2007 | Harwath | ................ | H01R 24/48 |
| | | | | 361/118 |
| 2008/0062606 A1 * | 3/2008 | Brown | ................... | H02H 9/042 |
| | | | | 361/111 |
| 2012/0250205 A1 * | 10/2012 | Pfitzer | ................... | H02H 9/041 |
| | | | | 361/91.1 |

(Continued)

*Primary Examiner* — Dharti H Patel
(74) *Attorney, Agent, or Firm* — SZDC Law PC

(57) ABSTRACT

There is provided a cable network power unit (22) configured to generate a DC power signal periodically switching between a positive and negative voltage, the power unit (22) comprising a polarity switching module (66), current measuring device (60), and a controller (64), wherein the controller (64) is responsive to abrupt changes in current to trigger the polarity switching module (66) to switch polarity of the DC power signal, and thereby reset surge protectors in active devices such as nodes or amplifiers if they have triggered due to a power surge, for example from a lightning strike.

8 Claims, 2 Drawing Sheets

(56)  References Cited

U.S. PATENT DOCUMENTS

| 2013/0208387 | A1* | 8/2013 | Nguyen | H02H 9/042 |
| | | | | 361/118 |
| 2015/0312048 | A1 | 10/2015 | Bodo et al. | |
| 2017/0133834 | A1* | 5/2017 | Blug | H02H 7/1255 |
| 2017/0178844 | A1* | 6/2017 | Ängquist | H02H 3/08 |
| 2019/0190246 | A1* | 6/2019 | Foster | H02H 3/20 |
| 2023/0162937 | A1* | 5/2023 | Telefus | H01H 9/548 |
| | | | | 361/2 |
| 2023/0223758 | A1* | 7/2023 | Quan | B60L 53/63 |
| | | | | 307/9.1 |
| 2024/0053396 | A1* | 2/2024 | Guillot | G01R 31/085 |
| 2024/0396326 | A1* | 11/2024 | Ariesen | H02H 9/02 |

* cited by examiner

CABLE NETWORK POWER UNIT FOR SURGE PROTECTOR RELEASE

This application claims priority to United Kingdom Patent Application No. GB 2307675.5, filed on May 23, 2023, which is incorporated by reference for all purposes as if fully set forth herein.

FIELD OF THE INVENTION

This invention relates to a cable network power unit for surge protector release, in particularly for use where active elements within a cable network are powered by DC power signals of switched polarity.

BACKGROUND OF THE INVENTION

A cable network comprises many active and passive devices connected by coaxial cable. The devices amplify or split the network signal to connect to multiple homes. The power for the active devices is provided via the coaxial cable. Typically the coaxial cables are above ground but underground installations also exist.

As much of the cable network is located outside homes, a direct or indirect lightning strike on the network is very common. To prevent damage to the active and passive devices during such a surge impulse, these devices have built-in surge protection.

For passive devices, the surge protection is generally provided by a sparking gap. This sparking gap will flash during the surge to absorb the energy and so protect components within the passive device.

For an active device, surge protection is more difficult to achieve as active devices often have lots of sensitive components. To protect these devices, often a gas tube, sidactor or other surge protector is used. When a voltage at a port becomes too high, for instance with a surge, the surge protector triggers using either a mechanical or electrical element to absorb the energy. Once the power drops to zero Volts, the surge protector will revert to its rest state. Existing cable networks are all fed via a sine wave or quasi-square voltage. So if the gas tube, sidactor or other surge protector is triggered, it will return to its rest state during the next zero crossing within the cycle. This is normally within 8 ms in a 60 Hz network and 10 ms in a 50 Hz network.

To reduce power consumption in the network, there is a desire to power active devices via a switched DC signal. For instance a network would be powered with positive 72V for 1 second, followed by a negative 72V for 1 second and so on. Thus the network can be considered as powered by a special low frequency block signal. However this causes problems with delays in releasing triggered surge protectors. If the gas tube, sidactor or other surge protector triggers just after the switch in DC voltage, the surge protector has to wait almost 1 second for the next zero Volt crossing point to be released back to its rest state. Although this time can be reduced by choosing a shorter DC switching cycle, even a 5 Hz switched DC signal would mean the surge protector might have to wait around 100 ms before resetting.

SUMMARY OF THE INVENTION

In accordance with one aspect of the present invention there is provided a cable network power unit configured to generate a DC signal periodically switching between a positive and negative voltage, the power unit comprising a polarity switching module, a current measuring means or device, and a controller, typically a microcontroller, wherein the controller is responsive to abrupt changes in current to trigger the polarity switching module to switch polarity of the DC signal. When such a power unit is used within a cable network such as a hybrid fiber coaxial network, the polarity switch in response to the abrupt change in current resets surge protectors in active devices such as nodes or amplifiers if they have triggered due to a power surge, for example from a lightning strike.

The controller is preferably connected between the current measuring means and the polarity switching module.

Preferably a comparator element is disposed between the controller and the current measuring means to compare a measured value with a reference value, and so determine when an abrupt change, i.e. a step change rather than a gradual change, has taken place.

The current measurement means may derive a value related to the current by measuring voltage across a resistive element.

Typically the periodic switching of the DC power signal takes place at a frequency in the range 5 to 0.2 Hz.

In accordance with another aspect of the invention, there is also provided a cable network comprising at least one cable network unit in accordance with any of the preceding claims, and such a cable network may be a hybrid fiber coaxial network.

The invention will now be described by way of example and with reference to the accompanying drawings in which.

DESCRIPTION

Figure 1:
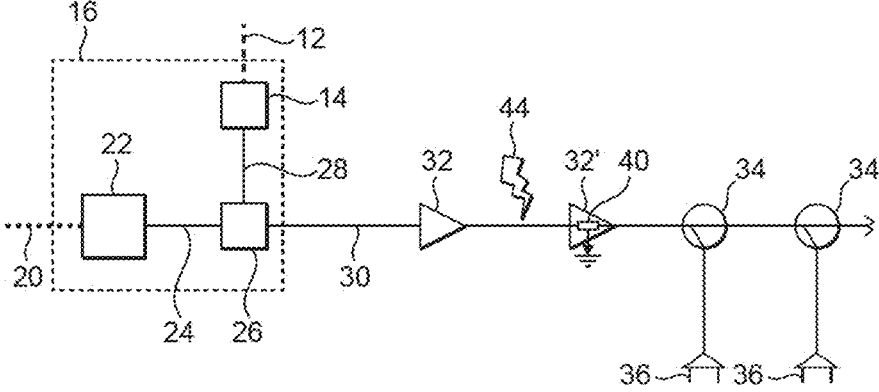
FIG. 1 is a schematic diagram of a cable network.

Part of a typical hybrid fiber coaxial (HFC) communication/broadband network 10 is shown in FIG. 1 where signal from a headend (not shown) is fed along optical fiber 12 to reach optical node 14 situated within a fiber to coax cabinet 16. A mains AC power supply 20 connects to an internal power supply 22 with transformer to generate a lower voltage signal which travels along coaxial cable 24 to reach power inserter 26.

A converted RF signal from optical node 14, or other RF devices such as Remote Phy or Remote Mac Phy devices, is also fed to power inserter 26 by way of coaxial cable 28. The combined signal from power inserter 26 travels along coaxial cable 30 to reach a plurality of active elements 32, 32' such as amplifiers located downstream of power supply 22, with at least some of these active elements associated with taps 34 and other network elements to supply a plurality of end users 36. Active element 32' positioned closest to taps 34 incorporates a surge protector 40 in the form of a gas discharge tube, sidactor or other type of surge protector which shorts to earth 42 should a maximum voltage be exceeded due to a surge such as lightning strike 44. Bi-directional broadband and/or communication signals travel between the headend and users 36.

DC powering is preferred over AC powering due to the interaction of AC with the power supplies of active elements such as nodes and amplifiers within HFC network 10. Internal power supply 22 incorporates a rectifier combined with at least one capacitor (not shown) to supply a DC power signal along coaxial cable 24. To mitigate galvanic corrosion the DC power switches polarity regularly, typically with frequencies under 50 Hz like 20 Hz, 5 Hz, or 0.2 Hz.

Figure 2:
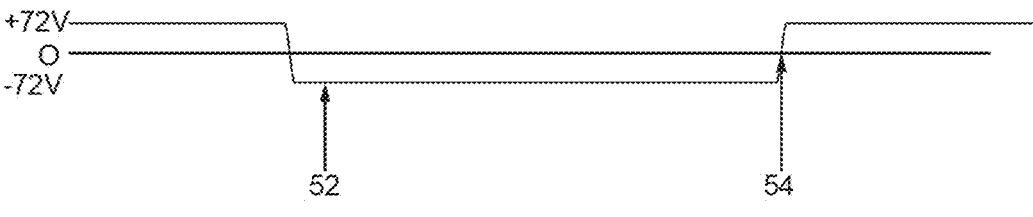
FIG. 2 is an explanatory diagram in relation to an DC power signal.

If there is an abrupt change in DC current, thus a step change rather than a gradual increase or decrease over time, for example due to a lightning strike, then surge protector 40 within amplifier 32' will be triggered and will remain active until the voltage drops to zero, which will occur at the next pre-arranged switch of the DC polarity. Even for a short DC switching cycle of 5 Hz, surge protector 40 might be active for around 100 ms before resetting. During this period the active elements incorporating surge protectors are inactive and thus communication is not possible between taps 34 and the headend. By way of example FIG. 2 shows part of a DC switching cycle 50 of 5 Hz where surge protector 40 has been triggered at point 52 just after a change in polarity and does not reset until the voltage becomes zero at point 54 when the DC polarity is switched again. There is thus a relatively long time of nearly 100 ms before surge protector 40 resets and communication can be restored between the headend and users 36.

Figure 3:
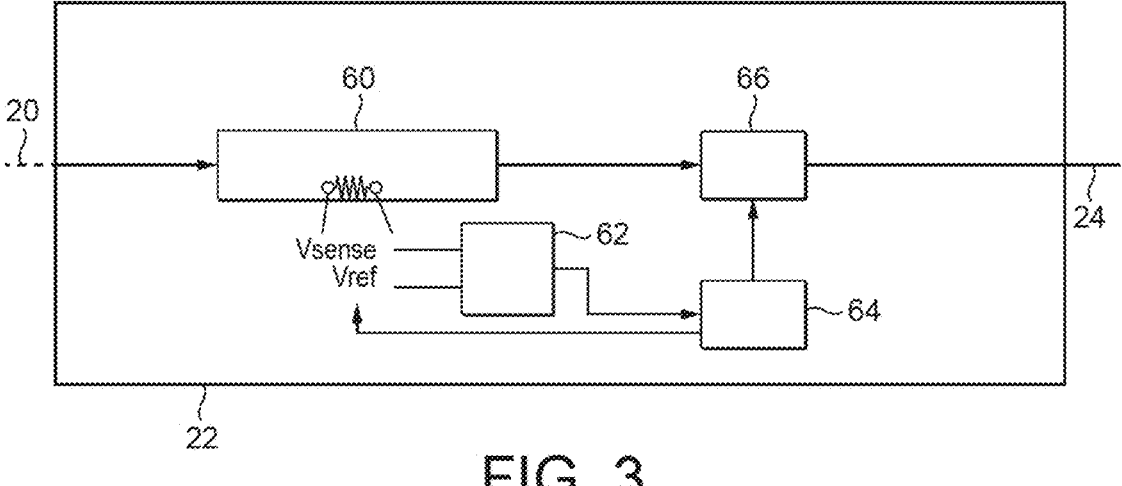
FIG. 3 is a schematic diagram of a power unit with surge protector release in accordance with the invention.

To ensure any network interruption is minimized, surge protector 40 needs to be reset as soon as possible after it has triggered. To achieve this, and as shown in FIG. 3, internal DC power supply 22 incorporates a measurement device or circuit 60 to measure the DC current delivered, generally by sensing voltage across a resistor, and a comparator device or circuit 62 which compares the measured values to a reference value defined when supply 22 is operational in a stable mode.

Figure 4:
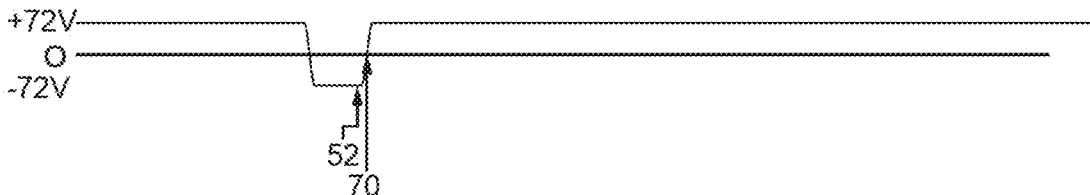
FIG. 4 is an explanatory diagram in relation to switching of the DC power signal within the power unit.

Detection of an abrupt change in the sensed value relative to the reference value results in microcontroller 64 reacting to send a signal to a polarity switching module 66 to change DC voltage from positive to negative or vice versa, so triggering the change through zero Volts as required to reset surge protector 40. This means that surge protector 40 can be reset quickly, typically within 1 to 5 ms, rather than waiting for the next configured switching point in the DC cycle, see for example FIG. 4 where reset occurs at point 70 and thus reset takes place for a greatly reduced duration than compared to resetting in relation to the normal cycle as shown in FIG. 2 at point 54.

Thus if for some reason the current drawn is suddenly changed, microcontroller 64 sends a command to polarity switching module 66 to change the polarity, which has the consequence of resetting the surge protector. If the change in current/voltage is due to a lightning strike causing an electrical surge to trigger the surge protector to become operational, then the surge protector is reset, restoring communication between the headend and users. If the current change occurred for a different reason not involving the surge protector, then no harm has been caused to the network as just an earlier switch in polarity has taken place.

If the new current value remains stable after polarity has been switched, then microcontroller 64 resets the reference value of comparator circuit 62 to the new value and this provides a way of adjusting for changes in current value resulting from installation of a new type of amplifier with different power characteristics within the network, for example.

By using changes in current detected at power unit 22, surge elements such as gas tubes or sidactors can be reset very quickly in a switched DC network. This ensures that active devices such as amplifier and nodes can be powered via switched DC voltage without the need to change the design of the active devices. This ensures that legacy active devices can remain operational within the network without needing to be replaced.

The invention claimed is:

1. A cable network power unit configured to generate a DC power signal periodically switching between a positive and negative voltage, the power unit comprising a polarity switching module, current measuring device, and a controller, wherein the controller is responsive to abrupt changes in current to trigger the polarity switching module to switch polarity of the DC power signal.

2. A cable network power unit according to claim 1, wherein the controller is connected between the current measuring device and the polarity switching module.

3. A cable network power unit according to claim 1, wherein a comparator element is disposed between the controller and the current measuring device to compare a measured value with a reference value.

4. A cable network power unit according to claim 1, wherein the current measurement device derives a value related to the current by measuring voltage across a resistive element.

5. A cable network power unit according to claim 1, wherein the controller is responsive to step changes in current.

6. A cable network power unit according to claim 1, wherein a switching frequency of the DC power signal is in the range 5 to 0.2 Hz.

7. A cable network comprising at least one cable network unit in accordance with claim 1.

8. A cable network according to claim 7, wherein the cable network is a hybrid fiber coaxial network.

\* \* \* \* \*